Nov. 2, 1926.                                                              1,605,743
J. LENIZ ET AL
SLED
Filed July 10, 1926
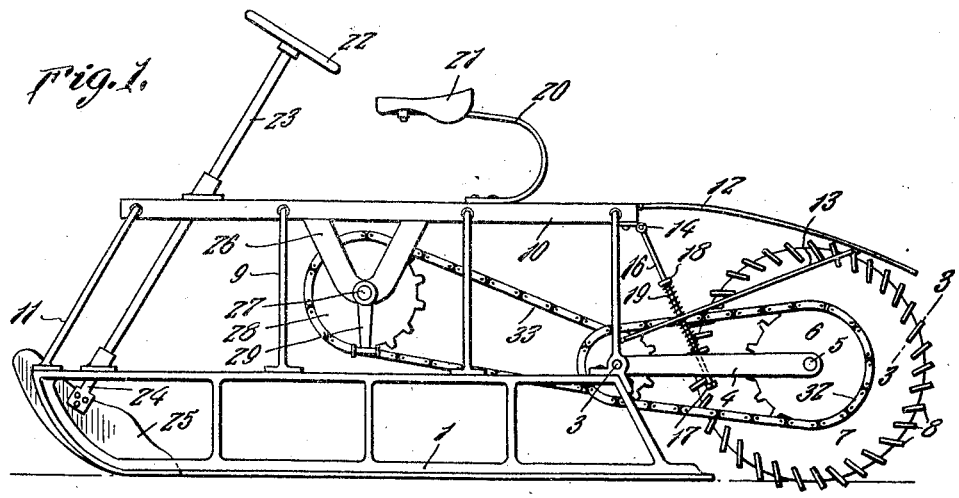
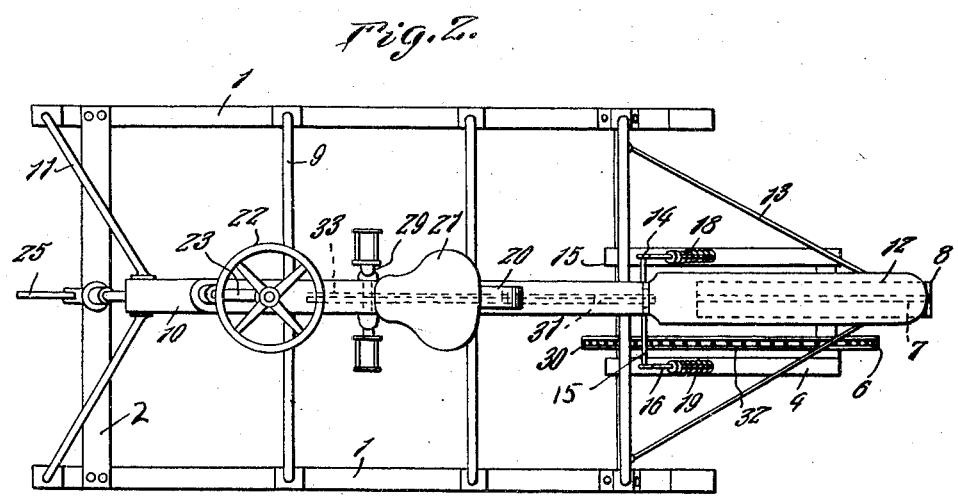
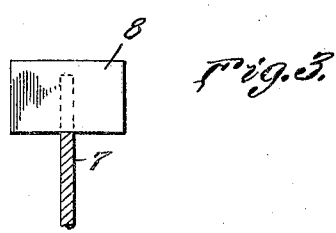
Joe Leniz
Frank Perurena
INVENTORS
BY Victor J. Evans
ATTORNEY Patented Nov. 2, 1926.

1,605,743

UNITED STATES PATENT OFFICE.

JOE LENIZ AND FRANK PERURENA, OF PARADISE VALLEY, NEVADA.

SLED.

Application filed July 10, 1926. Serial No. 121,604.

The object is the provision of a sled with means whereby the same may be manually propelled and accurately guided.

A further object is the provision of a sled which is primarily devised for use by juveniles to afford healthy exercise and pleasure but which at the same time may be used for commercial purposes, the device including a seat and pedal operated means for revolving a traction wheel of a particular and peculiar construction, and further wherein spring influenced means is provided for bringing the traction wheel into proper traction engagement with the snow or ice surface on which the sled travels and further wherein an auxiliary runner in the nature of a rudder is arranged in ground contacting position and is operated by a hand wheel which also serves as a rest for the hands of the operator of the device.

To the attainment of the foregoing the invention consists in the improvement as hereinafter described and definitely claimed.

In the drawings:

Figure 1 is a side elevation of our improvement.

Figure 2 is a top plan view thereof.

Figure 3 is a detail sectional view approximately on the line 3—3 of Figure 1.

As disclosed by the drawings, we employ a pair of runners 1 held in proper spaced relation by spaced transverse brace members 2. On the top members of the runners 1, at the rear thereof, there are suitable bearings for a transversely arranged shaft 3, the said shaft having journaled thereon rearwardly extending arms 4. A shaft 5 is journaled through the outer ends of the arms, suitable means holding the shaft from longitudinal movement. Fixed on the shaft there is a sprocket wheel 6 and also fixed on the shaft, inward of the sprocket wheel, there is the disc body 7 of the traction wheel. The disc 7 is formed with peripheral notches all inclined in the same direction and received in these notches and extending laterally with respect to the disc body of the wheel there are substantially rectangular calks 8. The calks project beyond the periphery of the body 7 of the wheel.

Arising from the top of the runners 1 there are the parallel arms of substantially U-shaped members 9, the said members centrally supporting on the upper elements thereof a longitudinally extending beam 10. The beam has its forward end braced, as at 11, to the forward ends of the runners 1, and the said beam carries at its rear end an outwardly extending downwardly arched guard fender 12. Angle braces 13 are connected between the fender and the rear member 9. Also at the rear of the beam 10 there is fixedly secured an eye 14 through which passes a rod 15, and to the ends of the rod 15 there are connected other rods 16. These rods 16 pass through suitable openings in the arms 4. The rods 16 are threaded and have screwed thereon nuts 17 which contact with the under face of the arms. Each rod 16 has fixed thereon a lug 18, and arranged around each rod and exerting a tension between the lug 18 thereon and the respective arms 4 there is a helical spring 19. The springs 19 tension the arms 4 to bring the traction wheel into proper ground surface engagement.

Fixed on the beam 10 there is the spring support 20 for the seat 21, and forward of the seat 21 there is a steering wheel 22 having a suitable steering rod which is received through a steering rod housing 23 that extends at a downward and outward angle through the beam 10 and through the forward and flat transverse brace member 2. The lower end of the steering rod, indicated by the numeral 24, has fixedly secured thereto a rudder 25 and this rudder is in ground contacting engagement.

On the under face of the beam 10, forward of the seat 21 there are depending brackets 26, and journaled in suitable bearing openings in the brackets there is a shaft 27. Fixed on the portion of the shaft between the brackets 26 there is a sprocket wheel 28 and fixed on the ends of the shaft there are oppositely directed pedals 29. On the shaft 3 there are two spaced sprocket wheels 30 and 31. The sprocket wheel 30 aligns with the sprocket wheel 6 and trained around these wheels there is a sprocket chain 32. The sprocket wheel 31 is in a line with the sprocket wheel 28, and trained around these wheels there is a sprocket chain 23.

The spring supported seat 21 provides a comfortable rest for the user of the sled. The hands of the user rest on the steering wheel 22 and his feet actuate the pedals 29. This, of course, turns the shaft 27 and imparts motion to the traction wheel 7. The particular and peculiar arrangement of the angle calks afford a comparatively broad ground contact for the traction wheel. The device may be easily and accurately guided by the forward runner which we have termed the rudder 25. The improvement is of comparatively simple construction and will afford amusement and healthy exercise to the user thereof, while the said device will be also found of importance for commercial business.

While we have illustrated a satisfactory embodiment of our improved device, our features of invention are capable of extended application, and we do not wish to be limited to the specific structure shown and described.

Having described the invention, we claim:

A sled of the class described, comprising a pair of spaced runners, a beam supported above the runners, a spring supported seat on the beam, a sprocket wheel having its shaft journaled in bearings below the beam, angle pedals on the ends of the shaft, pivotally supported arms extending from the rear of the runners and disposed centrally with respect thereto, a shaft journaled through the outer ends of the arms, a sprocket wheel fixed on the shaft, a traction wheel fixed on the shaft, said traction wheel comprising a disc body having laterally extending equidistantly spaced calks which project beyond the periphery of the body, pivoted rods carried by the beam and passing through the arms, adjusting means on the ends of the rods, spring means carried by the rods contacting with the arms, an arched fender extending from the beam of the traction wheel, a shaft, spaced sprockets on the shaft, sprocket chains trained around the last mentioned and the first mentioned sprocket wheels, a ground contacting rudder at the forward end of the runners and arranged centrally therebetween, an upwardly extending inwardly inclined post secured to the rudder, a housing for the post, and a wheel on the outer end of the post disposed opposite the seat.

In testimony whereof we affix our signatures.

JOE LENIZ.
FRANK PERURENA.